(12) United States Patent
Hatipoglu et al.

(10) Patent No.: US 10,097,033 B2
(45) Date of Patent: Oct. 9, 2018

(54) ELECTRICAL APPLIANCE HAVING ZERO STAND-BY POWER CONSUMPTION

(71) Applicant: ARCELIK ANONIM SIRKETI, Istanbul (TR)

(72) Inventors: Oner Hatipoglu, Istanbul (TR); Ahmet Ihsan Yuce, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 395 days.

(21) Appl. No.: 14/917,264

(22) PCT Filed: Sep. 5, 2013

(86) PCT No.: PCT/EP2013/068372
§ 371 (c)(1),
(2) Date: Mar. 7, 2016

(87) PCT Pub. No.: WO2015/032433
PCT Pub. Date: Mar. 12, 2015

(65) Prior Publication Data
US 2016/0218554 A1      Jul. 28, 2016

(51) Int. Cl.
*H01H 47/00*       (2006.01)
*H01H 35/00*       (2006.01)
*H02J 9/00*        (2006.01)
*G06F 1/32*        (2006.01)
*H01H 13/50*       (2006.01)
*H02M 7/06*        (2006.01)
*H01H 13/52*       (2006.01)
(Continued)

(52) U.S. Cl.
CPC .............. *H02J 9/005* (2013.01); *G06F 1/32* (2013.01); *H01H 13/50* (2013.01); *H01H 47/001* (2013.01); *H01H 47/22* (2013.01); *H02M 7/06* (2013.01); *H01H 13/52* (2013.01); *H01H 47/226* (2013.01); *H01H 89/00* (2013.01)

(58) Field of Classification Search
USPC ......................................................... 307/126
See application file for complete search history.

(56) References Cited

U.S. PATENT DOCUMENTS

2011/0249471 A1 * 10/2011 Costa ........................ G06F 1/32
363/13

FOREIGN PATENT DOCUMENTS

CN       101334644 A    12/2008
WO    2009/149655 A1    12/2009

OTHER PUBLICATIONS

International Search Report of PCT/EP2013/068372.
Written Opinion of the International Search Authority for PCT/EP2013/068372.

* cited by examiner

*Primary Examiner* — Rexford Barnie
*Assistant Examiner* — Dru Parries
(74) *Attorney, Agent, or Firm* — Kilpatrick Townsend & Stockton LLP

(57) ABSTRACT

The present invention relates to an electrical appliance comprising an electronic control unit (6) and a power circuit (7) supplying power to said electronic control unit (6), the power circuit (7) comprising a soft on/off switch (1) for turning on and off the electrical appliance, the soft on/off switch (1) being connected electrically in parallel with a relay (2) and a rectifier (3). The power circuit (7) further comprises an electrical node connecting the soft on/off switch (1) and the rectifier (3) to a button sensing circuit (4) and to an AC/DC converter (5) together.

16 Claims, 2 Drawing Sheets

Figure 1:
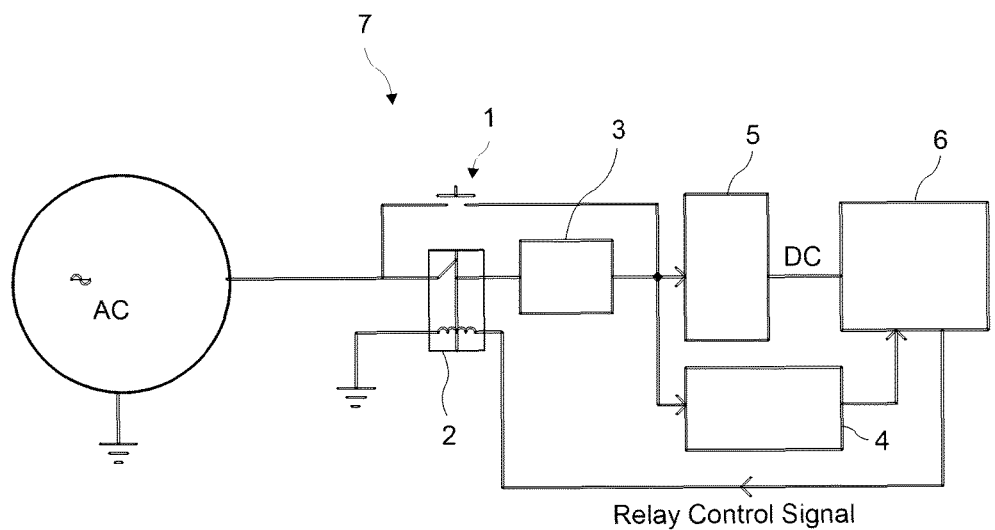

(51) Int. Cl.
*H01H 47/22* (2006.01)
*H01H 89/00* (2006.01)

ELECTRICAL APPLIANCE HAVING ZERO STAND-BY POWER CONSUMPTION

The present invention relates to an electrical household appliance that is powered by means of a soft on/off switch and which is capable of achieving a true zero power consumption stand-by state.

It is well-known that during stand-by mode, electrical and electronic household appliances continue power consumption after manual shutdown. Electronic devices equipped with soft on/off power switches are often controlled by an electronic control unit, which opens a user interface powering circuit to shut down the system. Typically, however, such soft on/off power switches require that said electronic control unit remains powered to reinitiate operation of the system in response to a user request. Evidently, the achieved stand-by mode does not serve as a true non-powered state of operation during which responsiveness is ensured in case of user intervention.

Among others, a prior art publication in the technical field of the invention may be referred to as CN 101334644, which discloses a power control turn-on/off circuit which takes a dual-coil dual-stable keeping relay as the kernel and comprises a turn-on micro-switch, a dual-coil dual-stable keeping relay, a booting coil driving circuit and a shutdown coil driving circuit.

The present invention, on the other hand, provides a circuit solution by which a true zero power consumption during stand-by mode is achievable. The invention further ensures that a single control button used to turn off an electrical appliance is usable to reinitiate an interrupted active mode. A further aspect of the present invention lies in that in case of power failure in the electrical network, the electrical appliance of the invention affords maintenance of the latest active or stand-by state when power is back.

The present invention provides an electrical appliance with a soft power switch assembly adapted to feature a zero-power off state allowing an off state with no power drain while maintaining user intervention capabilities as provided by the characterizing features defined in claim 1.

Primary object of the present invention is to provide an electrical appliance having a true zero-power off state allowing an off state with no power drain The present invention proposes an electrical appliance comprising an electronic control unit and a power circuit supplying power to the electronic control unit. A single soft on/off switch is used for turning on and off the electrical appliance. Said soft on/off switch is connected electrically in parallel with a relay, preferably a latching type relay. A rectifier is connected in series with said relay.

An electrical node to which the soft on/off switch and the rectifier lines are connected lead to a button sensing circuit and to an AC/DC converter through separate circuit lines. The relay's conduction mode is controlled by the electronic control unit by applying control signals in response to open and closed states of the latch relay when the soft on/off switch is closed. The electrical signal at the input terminals of the button sensing circuit is different based on the on/off state of the soft on/off switch. Said button sensing circuit generates a signal in a button signal line in electrical connection with the electronic control unit. The button sensing circuit generates a square-wave output signal in response to non-rectified AC input voltage.

Accompanying drawings are given solely for the purpose of exemplifying a circuit whose advantages over prior art were outlined above and will be explained in brief hereinafter.

The drawings are not meant to delimit the scope of protection as identified in the claims nor should it be referred to alone in an effort to interpret the scope identified in said claims without recourse to the technical disclosure in the description of the present invention.

FIG. 1 demonstrates a simplified circuit block diagram of a power circuit according to the present invention.

Figure 2:
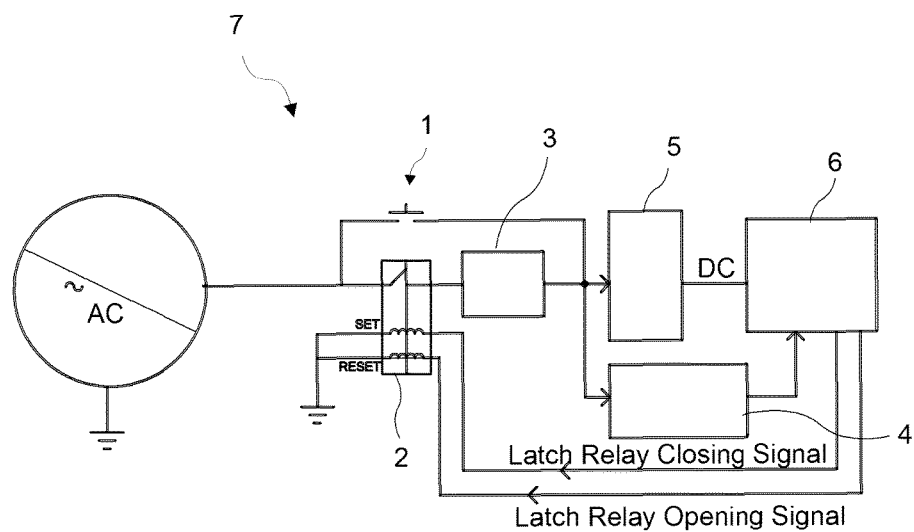

FIG. 2 demonstrates a simplified circuit block diagram of a power circuit with a latch relay according to the present invention.

Figure 3:
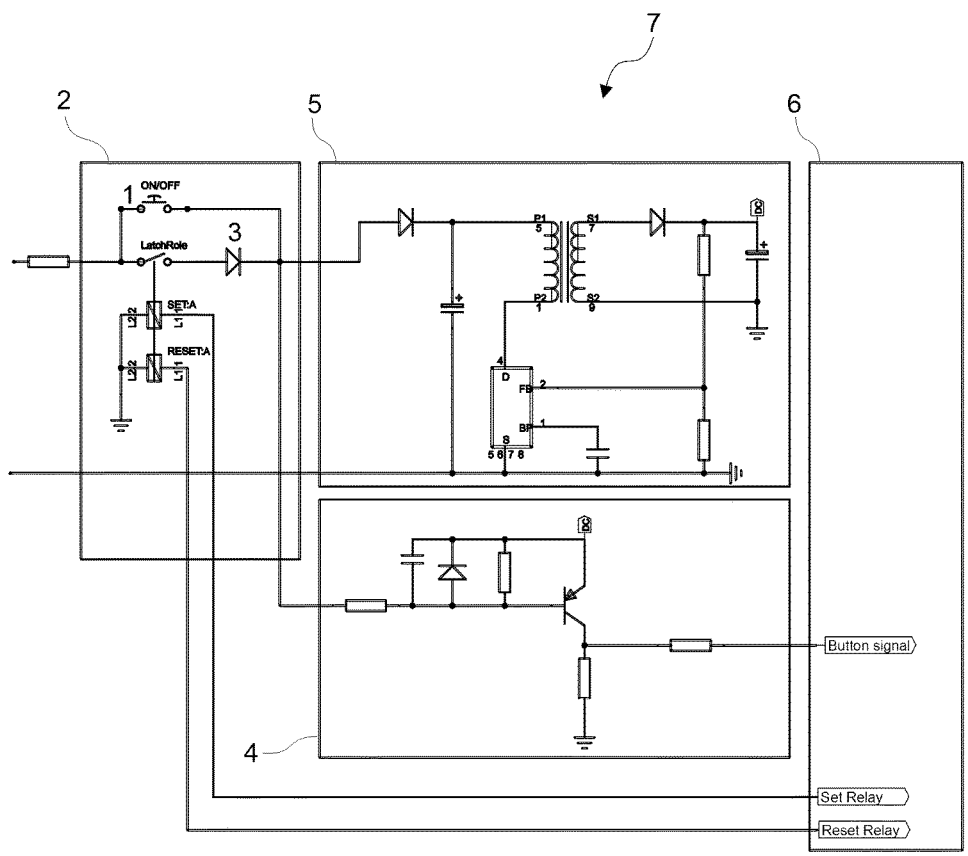

FIG. 3 demonstrates a circuit diagram of the power circuit according to the present invention.

The following numerals are used in the detailed description:
1. Soft on/off switch
2. Relay
3. Rectifier
4. Button sensing circuit
5. AC/DC converter
6. Electronic control unit
7. Power circuit The present invention proposes a power circuit (7) for an electrical appliance, for instance an electrical household appliance, such appliances including but not limited to rotary machines such as laundry treatment machines, TV sets, computers, printers and so on.

The power circuit (7) in the electrical appliance of the invention has a soft on/off switch (1), the latter typically serving to the purpose of turning the electrical appliance on and off. To turn off the electrical appliance, upon closing of the soft on/off switch (1) by the user, a microprocessor-based electronic control unit (6) receives a corresponding signal and cuts power supply to respective components of the electrical appliance, including the main user interface. This stand-by situation is maintained until a user attempts to energize the electrical appliance using the same button associated with said soft on/off switch (1). The soft on/off switch (1) does therefore not directly interrupt power supply to the load. The soft on/off switch (1) is a momentary action switch (1) that is released when the user removes his/her finger from the associated button.

As the electronic control unit (6) remains powered during stand-by mode, it still involves active power dissipation although no such indication is noticeable to the users. It is to be noted that zero stand-by power dissipation is achievable only if the electronic control unit (6) remains disconnected from the power supply circuit during stand-by mode.

According to the present invention, when a user turns off the electrical appliance, said electronic control unit (6) disconnects itself from the power supply by opening contacts of a relay (2) so as to achieve a true zero power consumption stand-by state. A button sensing circuit (4), which is normally connected to the relay (2) through a rectifier (3) when the soft on/off switch (1) is not closed, is directly connected to the AC power supply in case the soft on/off switch (1) is conducting.

In an embodiment of the present invention, in the electrical appliance, the power circuit (7) comprises a latching type relay (2).

Said rectifier (3) in series with the relay (2) is a half-wave rectifier, i.e. a diode rectifying the AC input into a half-wave output. The rectifier (3) basically ensures that the electrical signal at the input terminals of the button sensing circuit (4) is not converted into a square-wave signal by the same since only the negative part of the AC signal in a period T is converted.

As the electrical signal at the input terminals of the button sensing circuit (4) depends on the on/off state of the soft on/off switch (1), the electronic control unit (6) controls the relay (2) in accordance with the state of the soft on/off switch (1). Therefore, if the intention of the user is to turn off the electrical appliance, this is monitored by the electronic control unit (6) and it accordingly disconnects itself from the AC power supply.

According to the present invention, use of the relay (2) provides that the operational state of the electrical appliance is maintained upon restoration of power after a power failure. As is known to the person in the art, latching type relays have no default position and remain in their last position when the drive current stops flowing.

Now referring to FIG. 3, the relay (2) is provided in parallel with the soft on/off switch (1). Conduction and non-conduction of the relay (2) is controlled by the electronic control unit (6), that is, it is set and reset by applying control signals by the electronic control unit (6). Upon the current passing through the soft on/off switch (1) and flowing to the button sensing circuit (4), the latter generates a square-wave signal in a button signal line in electrical connection with the electronic control unit (6). This provides that the electronic control unit (6) is fed with a signal indicative of the status of the on/off switch (1), in response to which it opens the relay (2) in order for deenergizing itself.

The button sensing circuit (4) according to the present invention basically generates a square-wave output signal only in response to non-rectified AC voltage, which is the case if no current flows through the relay (2). Said button sensing circuit (4) comprises a PNP bipolar junction transistor whose base is triggered by the negative part of the AC signal and an intermittent DC output is accordingly obtained in said button signal line.

The electrical appliance according to the present invention therefore has two different operational modes. In the event that the electrical appliance is not energized and a user presses the button associated with the soft on/off switch (1), the AC/DC converter supplies DC power to the electronic control unit (6) and the latter in turn energizes the "set" coil of the relay (2). This ensures that the electronic control unit (6) remains energized when the soft on/off switch (1) is released by the user.

In the event that the electrical appliance is energized and a user presses the button associated with the soft on/off switch (1) to turn the same off, the soft on/off switch (1) will be closed and the button sensing circuit (4) will convert the non-rectified input signal into a square-wave output signal, upon which the electronic control unit (6) resets the relay (2) to the de-energized position, therefore activating zero stand-by power mode.

It is to be noted that the electronic control unit (6) executes the requested operation considering the on/off status of the relay (2). If the relay (2) is open, the electronic control unit (6) initiates turning on of the electrical appliance and where the relay (2) is conducting, the electronic control unit (6) de-energizes the electrical appliance by cutting its own power. In the latter case, the closing of the soft on/off switch (1) is communicated to the electronic control unit (6) by the button sensing circuit (4).

In a nutshell, the invention proposes an electrical appliance comprising an electronic control unit (6) and a power circuit (7) supplying power to the electronic control unit (6). The power circuit (7) has a soft on/off switch (1) for turning on and off the electrical appliance. The soft on/off switch (1) is connected electrically in parallel with a relay and a rectifier (3). The power circuit (7) further has an electrical node connecting the soft on/off switch (1) and the rectifier (3) to a button sensing circuit (4) and to an AC/DC converter (5) together. Conduction and non-conduction of the relay (2), preferably the latching type relay (2), is controlled by the electronic control unit (6) by applying control signals in response to open and closed states of the relay (2) at a time instance when the soft on/off switch (1) is closed. A latching type relay's advantage over a regular relay is that in case of power failure in the electrical network, the electrical appliance of the invention can maintain the latest active or stand-by state of the electrical appliance when power is back. However, it is evident to the person skilled in the art that a regular relay would also operate according to the present invention without fulfilling the above-mentioned function of a latching type relay.

The present invention therefore provides an electrical appliance with a soft power switch assembly adapted to feature a zero-power off state allowing an off state with no power drain while maintaining user intervention capabilities.

The invention claimed is:

1. An electrical appliance comprising an electronic control unit (6) and a power circuit (7) supplying power to the electronic control unit (6), the power circuit (7) having a soft on/off switch (1) for turning on and off the electrical appliance, the soft on/off switch (1) being connected electrically in parallel with a relay (2) and a rectifier (3), the power circuit (7) further having an electrical node connecting the soft on/off switch (1) and the rectifier (3) to a button sensing circuit (4) and to an AC/DC converter (5) through separate circuit lines characterized in that conduction and non-conduction of the relay (2) is controlled by the electronic control unit (6) by applying control signals in response to open and closed states of the relay (2) at a time instance when the soft on/off switch (1) is closed.

2. The electrical appliance as in claim 1, characterized in that the power circuit (7) comprising a latching type relay (2).

3. The electrical appliance as in claim 1, characterized in that electrical signal at the input terminals of the button sensing circuit (4) depends on the on/off state of the soft on/off switch (1).

4. The electrical appliance as in claim 3, characterized in that the button sensing circuit (4) generates a signal in a button signal line in electrical connection with the electronic control unit (6) by which the electronic control unit (6) is fed with a signal indicative of the status of the on/off switch (1).

5. The electrical appliance as in claim 4, characterized in that the button sensing circuit (4) generates a square-wave output signal in response to non-rectified AC input voltage.

6. The electrical appliance as in claim 2, characterized in that the rectifier (3) in series with the latching type relay (2) is a diode rectifying the AC input into a half-wave output.

7. The electrical appliance as in claim 4, characterized in that the button sensing circuit (4) comprises a PNP bipolar junction transistor whose base is triggered by the negative part of the AC signal so as to generate an intermittent DC output in the button signal line.

8. The electrical appliance as in claim 2, characterized in that in case the appliance is not energized and a user presses a button associated with the soft on/off switch (1), the AC/DC converter supplies DC power to the electronic control unit (6) and the latter closes the relay (2) and in case the appliance is energized and a user presses the button associated with the soft on/off switch (1), the button sensing circuit (4) converts the non-rectified input signal into a square-wave output signal, upon which the electronic control unit (6) resets the relay (2) to de-energized position and accordingly cuts power supply to components of the electrical appliance, including the main user interface and itself.

9. The electrical appliance as in claim 2, characterized in that electrical signal at the input terminals of the button sensing circuit (4) depends on the on/off state of the soft on/off switch (1).

10. The electrical appliance as in claim 9, characterized in that the button sensing circuit (4) generates a signal in a button signal line in electrical connection with the electronic control unit (6) by which the electronic control unit (6) is fed with a signal indicative of the status of the on/off switch (1).

11. The electrical appliance as in claim 9 characterized in that the button sensing circuit (4) generates a square-wave output signal in response to non-rectified AC input voltage.

12. The electrical appliance as in claim 5, characterized in that the button sensing circuit (4) comprises a PNP bipolar junction transistor whose base is triggered by the negative part of the AC signal so as to generate an intermittent DC output in the button signal line.

13. The electrical appliance as in claim 10, characterized in that the button sensing circuit (4) comprises a PNP bipolar junction transistor whose base is triggered by the negative part of the AC signal so as to generate an intermittent DC output in the button signal line.

14. The electrical appliance as in claim 11, characterized in that the button sensing circuit (4) comprises a PNP bipolar junction transistor whose base is triggered by the negative part of the AC signal so as to generate an intermittent DC output in the button signal line.

15. The electrical appliance as in claim 5, characterized in that in case the appliance is not energized and a user presses a button associated with the soft on/off switch (1), the AC/DC converter supplies DC power to the electronic control unit (6) and the latter closes the relay (2) and in case the appliance is energized and a user presses the button associated with the soft on/off switch (1), the button sensing circuit (4) converts the non-rectified input signal into a square-wave output signal, upon which the electronic control unit (6) resets the relay (2) to de-energized position and accordingly cuts power supply to components of the electrical appliance, including the main user interface and itself.

16. The electrical appliance as in claim 11, characterized in that in case the appliance is not energized and a user presses a button associated with the soft on/off switch (1), the AC/DC converter supplies DC power to the electronic control unit (6) and the latter closes the relay (2) and in case the appliance is energized and a user presses the button associated with the soft on/off switch (1), the button sensing circuit (4) converts the non-rectified input signal into a square-wave output signal, upon which the electronic control unit (6) resets the relay (2) to de-energized position and accordingly cuts power supply to components of the electrical appliance, including the main user interface and itself.

* * * * *